United States Patent [19]
Teich

[11] Patent Number: 5,690,360
[45] Date of Patent: Nov. 25, 1997

[54] SUPPLEMENTARY WEIGHT FOR A VEHICLE

[75] Inventor: Michael Teich, Mannheim, Germany

[73] Assignee: Deere & Company, Moline, Ill.

[21] Appl. No.: 671,191

[22] Filed: Jun. 27, 1996

[30] Foreign Application Priority Data

Aug. 3, 1995 [DE] Germany .................. 195 28 473.9

[51] Int. Cl.$^6$ .................. B60B 39/00; B62D 49/08
[52] U.S. Cl. .................. 280/759; 172/611; 212/195; 414/673; 414/719
[58] Field of Search .................. 280/759, 757, 280/758, 755; 212/195, 178; 414/719, 673; 172/611

[56] References Cited

U.S. PATENT DOCUMENTS

| | | | |
|---|---|---|---|
| 3,635,493 | 1/1972 | Barth et al. | 280/759 |
| 4,094,534 | 6/1978 | Welke et al. | 280/759 |
| 4,232,883 | 11/1980 | Bourgeous et al. | 280/759 |
| 5,219,180 | 6/1993 | Zipser et al. | 280/759 |

FOREIGN PATENT DOCUMENTS

| | | | |
|---|---|---|---|
| 1 263 520 | 3/1968 | Germany | 280/755 |
| 1 941 316 | 2/1973 | Germany . | |
| 25 48 977 | 5/1976 | Germany | 280/759 |
| 2 914 125 | 10/1980 | Germany . | |

*Primary Examiner*—Brian L. Johnson
*Assistant Examiner*—Peter C. English

[57] ABSTRACT

A supplementary weight for ballasting a vehicle can be adapted to be hooked onto a carrier component. The weight includes an entry opening which is bordered by an upper leg and a lower leg. The upper leg is supported on the carrier component which projects into the entry opening. Generally vertical bores extend in the upper leg and the lower leg, and the leg bores are aligned with a corresponding vertical bore in the carrier component. An attaching bolt is received by these bores when the weight is mounted on the carrier component. The attaching bolt has a head, a shank and a threaded section. The attaching bolt is screwed into an axially movable tensioning device which is mounted inside the lower leg, thus clamping the carrier component to the upper leg.

10 Claims, 3 Drawing Sheets

SUPPLEMENTARY WEIGHT FOR A VEHICLE

BACKGROUND OF THE INVENTION

The invention relates to a supplementary weight for ballasting an agricultural tractor.

A known supplementary weight has at least one entry opening bordered by an upper and a lower leg and open at the side. Into this entry opening a carrier component on the side of the vehicle can be inserted, for example, a base weight fastened to the front of the vehicle, in such a way that the upper leg of the supplementary weight is supported on the carrier component and that the base weight is supported by the carrier component. Recesses extend in the upper and the lower leg of the supplementary weight which are at least partially aligned with each other and are generally vertical. The recesses accept an attaching bolt that also extends through a vertical locating recess of the carrier component that is aligned with the recesses in the supplementary weight, when the supplementary weight is hooked into the carrier component, and that is used to secure the supplementary weight to the carrier component.

For the ballasting of an agricultural tractor plate-shaped ballast weights are usually employed that can be hooked onto and secured to a carrier component on the vehicle in transverse direction as a series of laminations alongside each other. Such ballast weights are described in DE-C-1 941 316. For the attachment a vertical retainer is used that is provided on the carrier component, for example, a bolt that is engaged by a semi-cylindrical, vertical slot in the two ballast weights adjacent to the bolt. After being hooked onto the carrier component the ballast weights are assembled to each other with tension screws that extend through transverse bores through all ballast weights. The attachment between the carrier component and the ballast weight includes a clearance so that shocks and vibrations applied to the vehicle cause a relative movement between the carrier component and the ballast weights. Such relative movement may cause noise.

The plate-shaped ballast weights frequently weigh approximately 50 kg. and therefore can be handled only with difficulty. Therefore, it is common practice to use one-piece supplementary weights that can be picked up by lifting devices. Such one-piece supplementary weights contain pins protruding to the side that can be picked up by a front or rear coupling arrangement of the tractor. During the course of the field operation the ballast weights remain on the coupling arrangement. However, an appropriate coupling arrangement is not always available. Furthermore, it is frequently desirable that the coupling arrangement or its actuating devices be available during the operation and not be preempted by weights carried.

SUMMARY OF THE INVENTION

Accordingly, an object of this invention is to provide a supplementary weight which can be handled simply and securely and which can be attached to a carrier component of the vehicle without clearance.

These and other objects are achieved by the present invention, wherein a supplementary weight has an attaching bolt for the attachment device which is supported axially on the upper leg by the bolt head. In the recess of the lower leg an axially movable tensioning device is arranged which contains a threaded bore into which the attaching bolt can be screwed.

For the attachment of the supplementary weight to the carrier component the supplementary weight is brought close to the carrier component so that a free end of the carrier component engages the entry opening of the supplementary weight and the two recesses of the supplementary weight are aligned with a locating recess of the carrier component. Then the attaching bolt is inserted through the recess of the upper leg into the entry opening of the supplementary weight and screwed into the threaded bore of the tensioning device. Thereby the tensioning device is drawn upward. It approaches the carrier component and clamps it between the upper leg and the tensioning device.

A one-piece weight can be lifted by appropriate lifting devices for example, a three-point hitch of the vehicle. For reasons of casting technology it is advantageous to configure the supplementary weight as a multi-piece design, preferably in three pieces, in order to keep the cooling period after casting within acceptable limits. In a multi-piece design, three partial weights can be arranged alongside each other and permanently assembled to each other, with the recesses extending through the upper and lower legs being located in the central partial weight.

Such a supplementary weight is simply and safely handled and permits an attachment without any clearance to a carrier component of the vehicle. When the tensioning device is in its lower position, the entry opening offers a large free aperture for the pickup process.

In a preferred embodiment, the tensioning device is a threaded bushing that is cylindrical in at least some section and that is arranged axially movable in a recess, at least partially cylindrical, in the lower leg. The surface of the threaded bushing facing upward is larger than the cross section of the locating recess in the carrier component so that the threaded bushing can be supported on the region of the rim of the locating recess. For this purpose the threaded bushing can be provided with a surface that widens in the upward direction or contain an intermediate component. A low manufacturing cost, however, is offered by a cylindrical threaded bushing whose diameter over the length of the threaded bushing is constant and greater than the diameter of the locating recess in the carrier component.

Appropriately means are provided for securing the tensioning device against rotation. For this purpose a bracket projects into the entry opening and is fastened to the upper section of the tensioning device and that engages the side wall of the entry opening and that prevents a rotation of the tensioning device during its axial movement. Since this bracket projects beyond the recess in the lower leg, it limits the axial movement of the tensioning device and prevents it from moving downward out of the recess in the lower leg. This offers protection against loss.

To improve the entry of the attaching bolt into the threaded bore of the tensioning device, the tensioning device is preferably provided with a bore whose upper section is configured as a cylindrical centering bore for the axial movement at the entry of the lower end of the attaching bolt. The attaching bolt can be screwed into a threaded section into which is adjacent to the centering bore. The free end of the attaching bolt may have a a conical chamfer to assist entry.

The tensioning device includes a generally axial opening downward adjacent to the threaded section, for example, a cylindrical bore, whose cross section is considerably larger than the cross section of the threaded bore (for example, twice as large). The axial length of the tensioning device should be sufficiently large so that the attaching bolt, when completely assembled (tensioned position), ends within the opening and does not project beyond the tensioning device. This configuration protects the threads against dirt and damage.

In order to retain the tensioning device in the recess in the lower leg without any danger of loss, a dog, pin or the like projects radially outwardly from the lower end of the tensioning device. The projection engages a stop in the lower leg and limits the axial upward movement of the tensioning device.

In a preferred embodiment, the attaching bolt is provided with a head region for the purpose of support on the upper leg (for example, a bolt head with washer), a generally cylindrical central shank and an adjacent threaded section. The cylindrical section carries a spacer bushing that is free to rotate, one end of which is supported at the head end and is secured by a retaining device against axial movement and any danger of loss. The retaining device may be a retaining ring inserted into a groove in the attaching bolt or the like. The spacer bushing is guided in the generally cylindrical recess of the upper leg, free to slide. The spacer bushing is configured with such a length that it projects into the entry opening when the head region of the attaching bolt is seated on the upper leg, so that it can project into the locating recess of the carrier component. The outside diameter of the spacer bushing and the locating recess of the carrier component conform to each other so that the spacer bushing can be accommodated in the locating recess, free to slide. This embodiment makes it possible that the attaching bolt can be inserted during assembly without the use of any force and that it is loaded principally only by tension forces and not by any shear loads. Thereby a cost effective standard bolt with comparably small dimensions can be used.

In a further embodiment the upper leg includes a ridge or threshold in the region surrounding the outside of its recess which is directed downward towards the entry opening, and that the rear wall of the entry opening contains a depression in its upper region. Furthermore, a groove directed upward extends in the region of the rear wall of the entry opening in the upper leg and engages a dog directed upward in the carrier component. When the carrier component engages the entry opening the supplementary weight is supported by the region of its rim on the upper surface of the carrier component and is supported by its rear wall on the face of the carrier component. The spacing that is provided behind the rim region and in the rear wall creates a lever arm which amplifies the bearing force of the force of gravity of the weight developed during the clamping of the carrier component.

DETAILED DESCRIPTION

Figure 1:
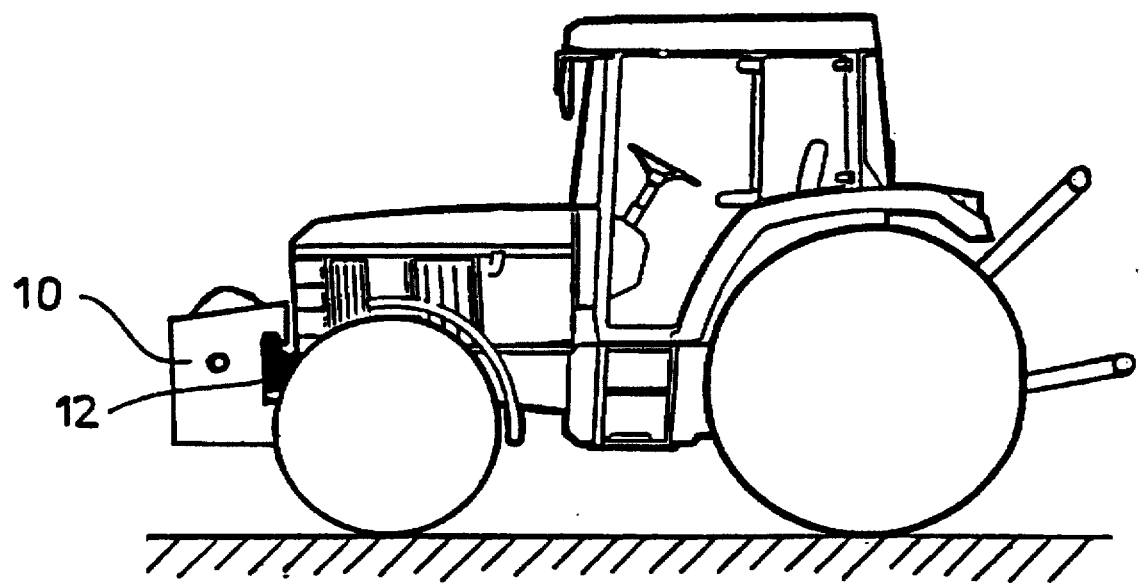
FIG. 1 shows an agricultural tractor that carries a supplementary weight according to the invention.

FIG. 1 shows an agricultural tractor to whose front side a carrier component 12, in particular a base weight, is attached. A supplementary weight 10 is hooked to the base weight 12 and is used to ballast the tractor.

Figure 2:
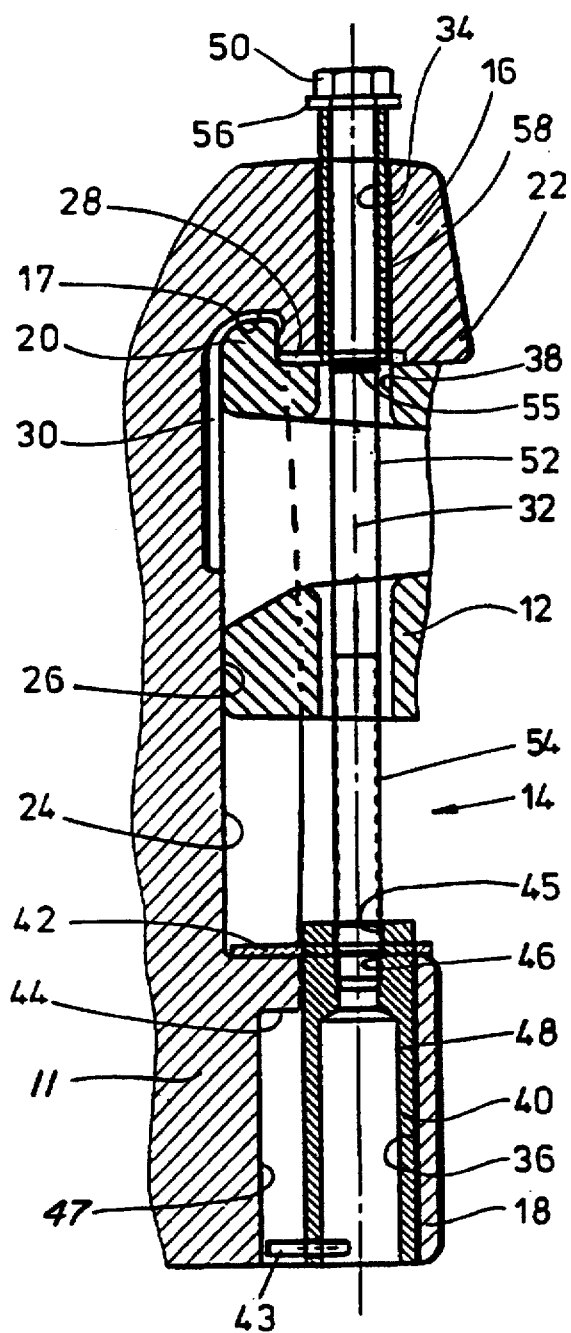
FIG. 2 is a sectional view through a part of a supplementary weight according to the invention with attachment means and through a carrier component in a first assembly condition.

Referring to FIG. 2, the supplementary weight 10 includes a weight section 11. The right side of the weight section 11 as seen in FIG. 2 faces a vehicle (not shown) to which a carrier component 12 is fastened. The carrier component 12 is inserted into an entry opening 14 of the supplementary weight, which is open to the side. The entry opening 14 is generally U-shaped and is bordered by an upper leg 16 and a lower leg 18.

The upper leg 16 is hook-shaped and contains a downwardly opening groove 17. The side surface of the groove 17 engages an upward projecting dog 20 of the carrier component 12. In an outer rim region of the entry opening 14, the upper leg 16 includes a shoulder 22 which projects downward into the entry opening 14 and which supports the weight 10 on the carrier component 12. Furthermore, a projecting part of the rear wall 24 of the entry opening 14 is supported on a lower end face 26 of the carrier component 12. Between the support or contact surfaces (17, 20, 22, 24 and 26), the carrier component 12 and the weight section 11 are spaced away from each other by free spaces 28, 30. As described in greater detail below, the configuration of the free spaces 28, 30 results in a lever arm between the shoulder 22 and the axis of the attaching bolt 32, which augments the contact force on the rear wall 24 of the weight section 11 and the end face 26 of the carrier component 12 during the clamping of the carrier component 12, and which makes possible an attachment of the weight section 11 without any clearance.

Through the upper leg 16 and the lower leg 18 there extend generally vertical bores 34 and 36 that are aligned with each other and with a vertical locating bore 38 in the carrier component 12 when the weight section 11 is hooked onto the carrier component 12. The bores 34, 36 and the bore 38 are generally cylindrical. The diameter of the locating bore 38 may be slightly larger than the diameter of the bore 34 in the upper leg 16.

The bore 36 in the lower leg 18 engages a cylindrical tensioning device 40, configured as a screw bushing, that can be moved vertically or axially in the bore 36. A bracket 42 is attached to the upper end of the tensioning device 40, which projects into the entry opening 14. Regardless of the vertical position of the tensioning device 40, the bracket 42 is supported at its one end on the rear wall 24 and thereby prevents a rotation of the tensioning device 40. Furthermore, the bracket 42 prevents the tensioning device 40 from falling out of the bore 36. A pin 43 projects to the side at the lower end of the tensioning device 40 and further protects against loss. The pin 43 projects into a groove 47 in the side of bore 36 in the lower leg 18. The groove 47 ends at a stop 44 and thereby limits the upward movement of the tensioning device 40.

Figure 4:
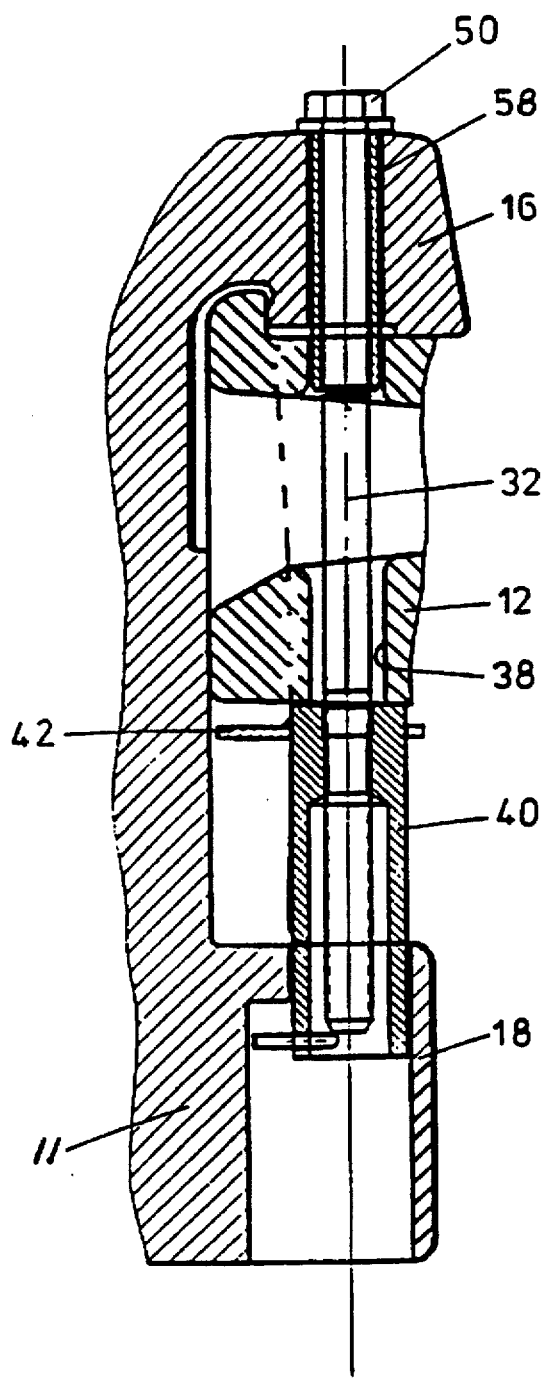
FIG. 4 is a view of the invention of FIG. 2 in a third assembly condition.

The tensioning device 40 has an axial bore whose upper section is configured as a cylindrical centering bore 45 which accepts the axial movement of the lower end of the attaching bolt 32. Below and adjacent to the centering bore 45 there follows a threaded bore 46 into which the attaching bolt 32 can be screwed. The threaded bore 46 is adjacent to a lower cylindrical bore 48 whose diameter is clearly larger than the diameter of the attaching bolt 32. The length of the tensioning device 40 is selected so that with the attaching bolt 32 fully assembled (as shown in FIG. 4) it does not project beyond the cylindrical bore 48. Furthermore in its lower position, in which the bracket 42 is in contact with the lower leg 18, the tensioning device 40 should not project beyond the lower contour of the weight section 11.

The attaching bolt 32 has a hexagonal bolt head 50, an adjacent cylindrical shank 52 and a threaded section 54. The lower end of the attaching bolt 32 is provided with a conical chamfer that makes it easier to insert the attaching bolt 32 into the bore of the tensioning device 40. A washer 56 and a spacer bushing 58 are arranged between the hexagonal bolt head 50 and a retaining device 55 which is fastened to the shank 52 so that they cannot be lost. The retaining device 55 may, for example, be a wire snap-ring assembled into a circumferential groove in the shank 52. The spacer bushing 58 can be rotated with respect to the attaching bolt 32. It engages with a sliding fit in the bore 34. The length of the spacer bushing 58 is designed in such a way that it projects into the entry opening 14 as long as the attaching bolt 32 is in contact through the washer 56 with the upper leg 16, that is when the attaching bolt 32 is in its lowest position. In this position the spacer bushing 58 can be received by bore 38.

The weight 10 is mounted on the carrier component 12 in the following manner:

Initially the attaching bolt 32 is removed from bores 34, 36 of the weight 10. As previously described the tensioning device 40 remains constantly with the weight 10. The weight 10 is lifted by suitable means and is hooked with its entry opening 14 onto the carrier component 12, so that bores 34, 36 and 38 are approximately aligned. Now the attaching bolt 32 is inserted in the upper bore 34 and bore 38, inserted into the centering bore 45 of the tensioning device 40 and screwed into the threaded bore 46. At this point the spacer bushing 58 does not yet enter the entry opening 14 or bore 38 (FIG. 2).

Figure 3:
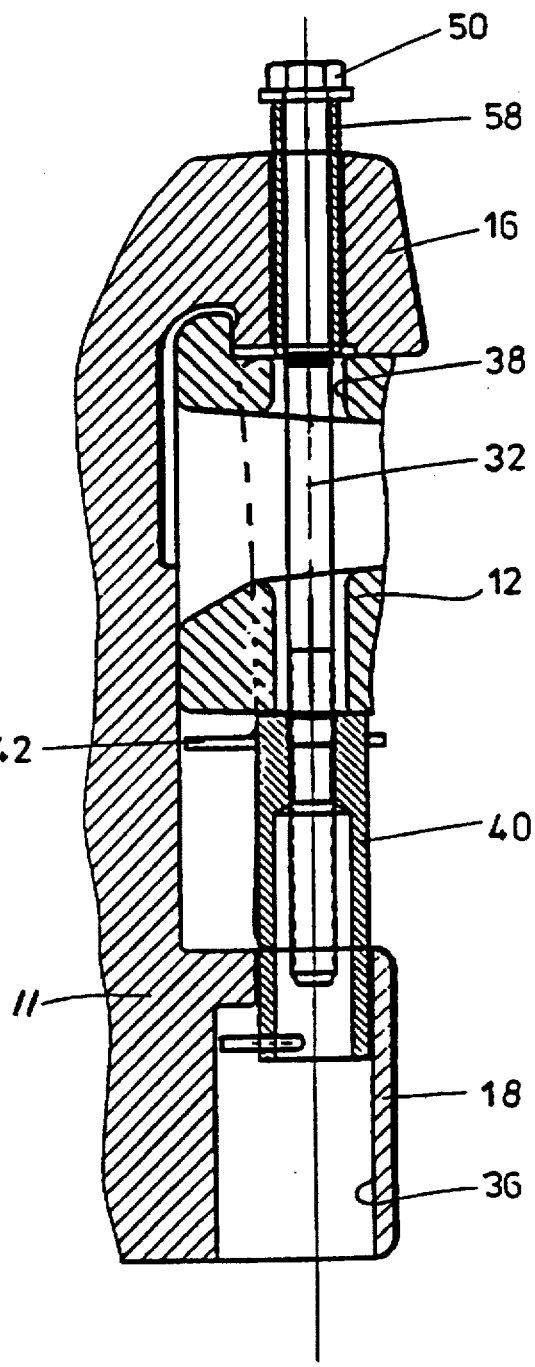
FIG. 3 is a view of the invention of FIG. 2 in a second assembly condition.

When the attaching bolt 32 is screwed into place the tensioning device 40 moves upward, until its upper end face comes into contact with the underside of the carrier component 12 (FIG. 3). Since the cross section of bores 34, 38 is considerably larger than the cross section of the attaching bolt 32, the attaching bolt 32 can be inserted into bores 34, 38 and screwed into the tensioning device 40 without applying any significant force, even if the bores 34, 36 are not exactly aligned with bore 38.

When the attaching bolt 32 is screwed further into place with the application of some torque the tensioning device 40 makes contact and is supported on the carrier component 12, so that now the attaching bolt 32 with the spacer bushing 58 is moved downward. At that time the spacer bushing enters bore 38 of the carrier component 12 and centers it to the upper bore 34, thereby the weight 10 is positioned precisely. When the standard torque is reached, all parts are clamped together (FIG. 4). The lever arm described above supports the bearing force of the force of gravity on the weight.

Figure 5:
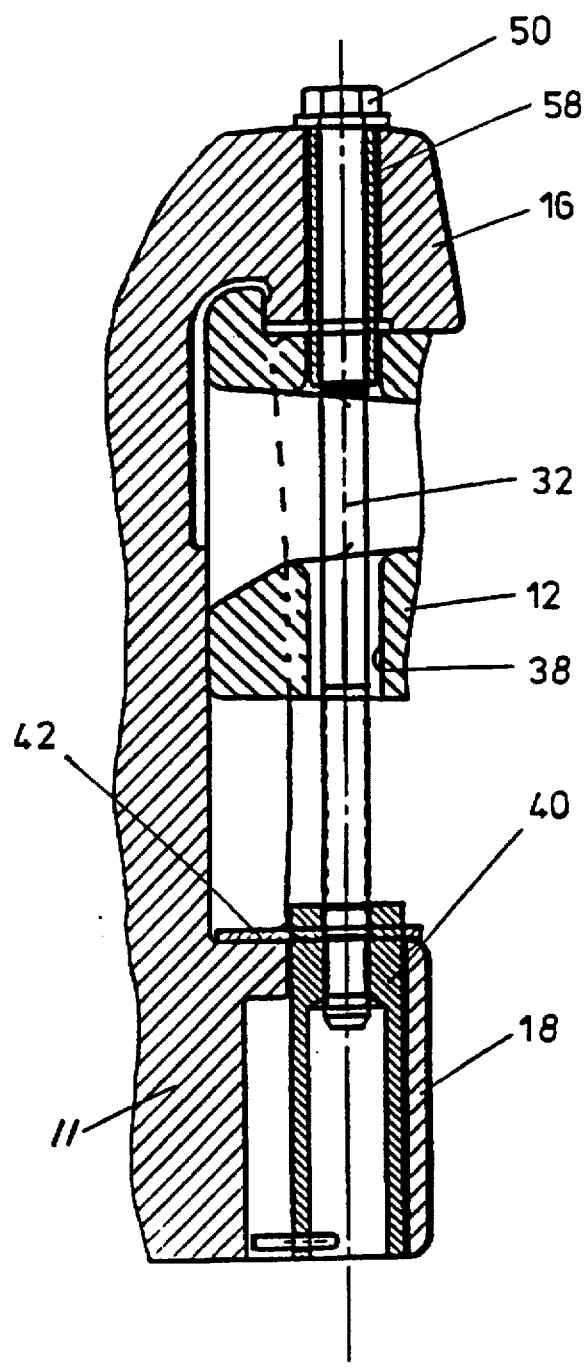
FIG. 5 is a view of the invention of FIG. 2 in a fourth assembly condition.

When the connection is loosened the tensioning device 40 initially moves downward, until the bracket 42 comes into contact with the lower leg 18. Here the spacer bushing 58 remains at first in bore 38 (FIG. 5). If the attaching bolt 32 is unscrewed further, then the spacer bushing 58 is drawn out of bore 38 until the attaching bolt 32 can finally be withdrawn freely.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A supplementary weight assembly for ballasting a vehicle, the weight assembly having at least one entry opening which is bordered by an upper leg and a lower leg and which opens on a side, the weight assembly being adapted to be hooked onto a carrier component, wherein the upper leg is supported on the carrier component which projects into the entry opening, wherein generally vertical bores extend in the upper leg and the lower leg, the leg bores being aligned with a corresponding vertical bore in the carrier component and receiving an attaching bolt when the weight assembly is mounted on the carrier component, characterized by:

the attaching bolt having a threaded section; and the bore in the lower leg receives an axially movable tensioning device, the device having a threaded bore into which the threaded section of the attaching bolt can be screwed, the attaching bolt and the tensioning device clamping the carrier component to the upper leg.

2. The supplementary weight assembly of claim 1, wherein:

the tensioning device comprises a threaded bushing having at least a portion which is cylindrical, and the tensioning device being movably received by the bore in the lower leg.

3. The supplementary weight assembly of claim 1, wherein:

a bracket is fastened to an upper section of the tensioning device, the bracket projecting into the entry opening, engaging a wall of the entry opening and preventing rotation of the tensioning device.

4. The supplementary weight assembly of claim 1, wherein:

the tensioning device includes a centering bore which slidably receives an end of the attaching bolt, the threaded bore being adjacent to the centering bore, and the threaded bore receiving the threaded section of the attaching bolt during assembly.

5. The supplementary weight assembly of claim 4, wherein:

the tensioning device includes a further bore adjacent to the threaded bore, the further bore having a diameter which is larger than a diameter of the threaded bore, and the tensioning device having an axial length which is dimensioned so that the threaded section of the attaching bolt is received by the further bore when the bolt is completely screwed into the tensioning device.

6. The supplementary weight assembly of claim 1, wherein:

a projection projects radially from a lower end of the tensioning device, and the projection being engageable with a stop in the lower leg to limit movement of the tensioning device towards the upper leg.

7. The supplementary weight assembly of claim 1, wherein:

the attaching bolt includes a head which is engageable with the upper leg and a generally cylindrical shank;

a spacer bushing rotatably received by the bore in the upper leg, the bushing receiving the shank; and a retaining device fixed to the shank for retaining the bushing thereon.

8. The supplementary weight assembly according to claim 7, wherein:

the spacer bushing has a length such that it extends into the entry opening and is received by the bore of the carrier component when the attaching bolt head engages the upper leg.

9. The supplementary weight assembly of claim 1, wherein:

the upper leg includes a shoulder which extends into the entry opening;

an upper portion of a rear wall of the entry opening forms a rearward facing depression and downward facing groove; and the carrier component includes a dog which is received by the depression and the groove.

10. The supplementary weight assembly of claim 1, wherein:

the supplementary weight comprises a plurality of partial weights arranged alongside each other, fastened to each other, which can be handled as a unit, and that the upper and lower leg bores are formed in one of the partial weights.

* * * * *